United States Patent [19]

Zivion et al.

[11] Patent Number: 5,372,626
[45] Date of Patent: Dec. 13, 1994

[54] FERTILIZER COMPOSITIONS FOR ADMINISTERING IONIC METAL MICROELEMENTS TO PLANT ROOTS

[76] Inventors: Yoram Zivion; Amnon Zusman, both of Givat Ada 37808, Israel

[21] Appl. No.: 15,308

[22] Filed: Feb. 9, 1993

Related U.S. Application Data

[63] Continuation of Ser. No. 732,402, Jul. 18, 1991, abandoned.

[30] Foreign Application Priority Data

Jul. 31, 1990 [IL] Israel ........................................ 95241

[51] Int. Cl.$^5$ ............................................... C05G 3/00
[52] U.S. Cl. ............................................... 71/11; 71/1; 71/27; 71/63; 71/64.1; 71/64.11; 71/DIG. 2
[58] Field of Search .......................... 71/DIG. 2, 64.11

[56] References Cited

U.S. PATENT DOCUMENTS

| | | | |
|---|---|---|---|
| 2,813,014 | 11/1957 | Allison et al. | 71/11 |
| 3,869,272 | 3/1975 | Windgasen | 71/1 |
| 4,265,653 | 5/1981 | Hoyt et al. | 71/11 |
| 4,581,057 | 4/1986 | Nooden | 71/27 X |

FOREIGN PATENT DOCUMENTS

| | | |
|---|---|---|
| 1152769 | 8/1983 | Canada . |
| 224402 | 9/1973 | France . |
| 827521 | 2/1960 | United Kingdom . |
| 1364464 | 8/1974 | United Kingdom . |
| 886874 | 12/1981 | U.S.S.R. . |

OTHER PUBLICATIONS

Gary R. Cline, P. E. Powell, P. J. Szaniszlo and C. P. P. Reid, "Comparison of the Abilities of Hydroxamic, Synthetic, and Other Natural Organic Acids to Chleate Iron and Other Ions in Nutrient Solution", Soil Sci. Soc. Am. J., vol. 46, (1982), p. 1158.

Almassy et al, "Trace-Element Fertilizer", 6001 Chemical Abstracts, 113 (1990) Jul. 2, No. 1.

Yona Chen and Phillip Barak, "Iron Nutrition of Plants in Calcareous Soils", Advances in Agronomy, vol. 35, (1982), pp. 217–240.

Phillip Barak and Yona Chen, "Determination of FeEDDHA in Soils and Fertilizers by Anion Exchange Chromatography", Soil Sci. Soc. Am. J., vol. 51, (1987), pp. 893–896.

Colin F. Bell, "Principles and Applications of Metal Chelation", Clarendon Press-Oxford, (1977), pp. 88–91 and 132–133.

*Primary Examiner*—Ferris Lander
*Attorney, Agent, or Firm*—Leonard Bloom

[57] ABSTRACT

Metal ions selected from the group consisting of $Fe^{+3}$, $Mn^{+2}$, $Cu^{+2}$ and $Zn^{+2}$ are administered to plant roots in a composition comprising citric acid, whereas the molar ratio of citric acid to metal ions in this composition is about 0.8 to 2.5.

10 Claims, No Drawings

FERTILIZER COMPOSITIONS FOR ADMINISTERING IONIC METAL MICROELEMENTS TO PLANT ROOTS

This application is a continuation of application Ser. No. 732,402, filed Jul. 18, 1991, and now abandoned.

FIELD OF THE INVENTION

The present invention is in the field of plant nutrition and is concerned with the administration of ionic metal microelements to plants. In particular, the present invention provides novel compositions and methods for administering iron, manganese, copper and zinc ions to the roots of plants.

BACKGROUND OF THE INVENTION AND PRIOR ART

Various metal ions are essential elements in plant nutrition and soil deficiency thereof is very often the cause of poor plant growth. Of particular importance for plant growth are iron, manganese, copper and zinc ions, iron being especially important. The following description of the prior art will focus in particular on the problems associated with the iron administration, but it should be understood that similar problems are associated also with the administration of the other three metals mentioned before.

Iron ions in the soil are present either in their di—($Fe^{+2}$) or trivalent ($Fe^{+3}$) form, neutral or alkaline conditions favouring the latter. In their trivalent form iron ions hydrolyse water to form highly stable precipitates, the solubility coefficient being in the order of $10^{38}$. Thus, in soils having a neutral or basic pH, such as calcareous soils in which the calcium carbonate acts as a buffer maintaining a high pH, iron precipitates rapidly becoming unavailable to plants' roots.

It has been hitherto proposed to administer iron in a divalent ionic salt form. However, this method did not prove to be sufficiently efficient.

The most widely accepted method for the administration of iron is in the form of a complex of a synthetic chelate, in particular FeEDDHA or FeEDDHMA (Chen and Barak, 1982, *Advances in Agronomy*, 35:217–239). The main disadvantage of these synthetic chelates is in their high price (see, for example, Barak and Chen, 1987, *Soil Sci. Soc. Am. J.* 51:893–896) but, as noted by Barak and Chen and others, the use of FeEDDHA to the administration of iron to the soil was nevertheless the method of choice. The high efficiency of using the synthetic chelate EDDHA for the administration of iron has also been shown by Bell, 1977 (Principles and Application of Metal Chelation, Clarendon Press, Oxford).

The use of organic acids, such as citrate, as chelating agents of metal ions has been proposed but as has been shown (e.g. Bell, 1977, supra), citrate was found to be far inferior in its properties than the above synthetic chelating agents at pH below 11 (see page 133, fourth paragraph of Bell, 1977, supra). As shown by Cline et al., 1982 (*Soil Sci. Soc. Am. J.* 46:1158–1164), ion chelates comprising citrate as the chelating agent were unstable at pH above 7.

A composition comprising citric acid and metal ions has been described in SU-886874. The composition according to this patent is probably a pesticidal composition intended for topical application onto plant leaves and comprises various other ingredients including an adherent substance and sulfur which latter is probably the pesticidally active agent. A compositon comprising ferric ions and citric acid has been described in CA-1,152,769. The composition according to this latter patent comprises also a nitrogen source which is an essential ingredient, and is used for the topical administration of ferric ions to plants, via their leaves. None of these patents discloses or even suggests that citric acid may be used as a chelating agent in composition for administering metal ions to plant roots.

The prior art thus taught away from using organic acids in general, and citrate in particular, as chelating agents for the administration of metal ions to the soil in a form available to plant roots. The entire research was concentrated on finding more efficient ways of using synthetic chelates to this end.

GENERAL DESCRIPTION OF THE INVENTION

The present invention is based on the surprising discovery that metal ions selected from the group consisting of $Fe^{+3}$, $Mn^{+2}$, $Cu^{+2}$ and $Zn^{+2}$ can effectively be supplemented to soils in a composition comprising these metal ions (to be referred to hereinafter at times as "said metal ions") together with citrate in a molar ratio of citrate to said metal ions of about 0.5–2.5. Administration of such a composition to soils was found to render said metal ions available to plant roots even in neutral or alkaline soils, as evidenced by positive effect on plants' health and growth rate.

The present invention thus provides a plant fertiliser composition comprising one or more metal ions selected from the group consisting of $Fe^{+3}$, $Mn^{+2}$, $Cu^{+2}$ and $zn^{+2}$ and citric acid, the molar ratio of citric acid to said metal ions being about 0.5 to about 2.5.

Preferably the molar ratio of citric acid to said metal ions is about 0.8 to 2.0, the ratio of about 1.0 to about 1.5 being particularly preferred.

The composition of the present invention may be provided as a dry particulate solid (to be referred to hereinafter at times as the "dry composition of the invention"), e.g. in the form of powder or granulates, which may be administered to the soil as such or after its dissolution in water. Compositions in accordance with the present invention may also be provided in the form of an aqueous solution (to be referred to hereinafter at times as the "liquid composition of the invention"), either ready for administration or as a concentrate which is diluted prior to use.

A further aspect of the invention is a method for providing one or more metal ions selected from the group consisting of $Fe^{+3}$, $Mn^{+2}$, $Cu^{+2}$ and $Zn^{+2}$ to plant roots, which method comprises administering said ions to the soil in which the plants grow in a composition comprising citric acid and said one or more metal ions, in a molar ratio of citric acid to metal ions of about 0.5 to 2.5, preferably about 0.8 to 2.0, and most preferably about 1.0 to 1.5.

Said metal ions may be administered by various means known per se. A dry composition of the invention may be administered by spreading granulates or powder of such a composition on the soil or by introducing same to the soil during tilling thereof. A liquid composition in accordance with the invention may be administered by direct spraying or by introducing same through the irrigation system.

The above method and compositions are particularly useful for administering said ions to calcareous soils. Furthermore, the composition and method of the present invention are useful in the treatment of plant chlorosis.

In the following, the invention will be illustrated with reference to some non-limiting Examples:

EXAMPLE 1

*Annona sp.* plants were grown on a shallow mountainous rendzina soil, having a high lime content. The entire plantation was irrigated with sprinklers and had a fertilization system forming part of the irrigation system.

The plantation was divided into two plots (each having an area of 2,000 m$^2$): plot A received three consecutive weekly treatments of 1 kg FeEDDHA each, administered through the irrigation system; plot B, which had a separate irrigation system, received three consecutive weekly treatments each consisting of 1 l of an aqueous composition in accordance with the invention comprising (mole/liter): FeCl$_3$ - 0.98, MnSO$_4$ - 0.17, ZnSO$_4$ - 0.057, CuSO$_4$ - 0.04, citric acid - 1.8.

The treatment of plot A started during the month of May and the treatment of plot B commenced 10 days later.

Prior to the treatment, the plants in both plots showed signs of chlorosis. A week after the beginning of the treatment in plot A, a greening of most of the plants was observed. When the treatment commenced in plot B, most of the plants of plot A were already entirely green and in a rapid growth phase.

A week following the onset of treatment, most of the plants in plot B started to green, the greening becoming evident in all plants after about two weeks. One month after the onset of treatment, the plants of both plots had a similar green colour and the plants in both plots had a similar growth rate.

In both plots several plants, in about equal proportions in both, remained chlorotic even after the treatment. Notably, however, the chlorosis was much more pronounced in the respective plants in Plot A as compared to Plot B. Adding the composition in accordance with the invention to those plants in Plot A improved their condition considerably.

EXAMPLE 2

Plum trees (*Prunus sp.*) were grown on a similar soil as in Example 1. Irrigation and fertilization were central.

The trees sprouted in the spring (during the month of April). The trees were not treated with ionic metal microelements.

Some of the trees showed a certain degree of chlorosis evidenced by yellow leaves relative to other trees, which had dark or light green leaves. Some of the chlorotic trees were treated with 40 ml of a composition in accordance with the invention, which was administered by infusing same directly into the ground below a dripper of the irrigation system. The administered composition consisted of the following ingredients (moles/liters): FeCl$_3$ - 0.23, MnSO$_4$ - 0.425, ZnSO$_4$ - 0.17, CuSO$_4$ - 0.115, citric acid - 1.09.

After about two weeks, the treated trees greened and the leaves started to grow, in contrast to untreated chlorotic trees which remained yellow and did not show signs of leaf growth. After an additional period of several days, the treated trees could not be distinguished from the healthy trees.

EXAMPLE 3

Pepper (*Capsicum sp.*) was grown on a loessial soil having a lime content of about 20%. The entire plot had a central irrigation and fertilization system, the water supplied to the plants by drippers. The plants in the plot were chlorotic which was evidenced by their light green colour.

The plot was divided into three sub-plots, each receiving a different treatment: plot A was treated with a fertilizer composition in accordance with the invention, consisting (moles/liters) of: FeCl$_3$ - 0.98, MnSO$_4$ - 0.17, ZnSO$_4$ - 0.057, CuSO$_4$ - 0.04, citric acid - 1.8, dissolved in 1 liter of water; plot B was treated in the same manner with 1 kg. per 1,000 m$^2$ of FeEDDHMA; plot C received no treatment at all.

After two weeks, the plants in plot A were greener and larger than both the plants in plot B and in plot C.

EXAMPLE 4

Vines (*Vitis cv. Sultanina*) were grown in a vineyard having a total area of 6,000 m$^2$ on a shallow mountainous rendzina soil. Water was administered by drip irrigation and the vineyard had a central fertilization system. The entire vineyard was treated with a commercial FeEDDHA in an amount of 1 kg. per 1,000 m$^2$. Notwithstanding this iron treatment, about half of the plants remained yellow and their growth was inhibited.

After about four weeks, the unhealthy plants were treated with a composition in accordance with the invention consisting (moles/liter) of: FeCl$_3$ - 0.74, MnSO$_4$ - 0.51, ZnSO$_4$ - 0.057, CuSO$_4$ - 0.04, citric acid - 1.75. The treatment consisted of the administration of 2 liters of this composition per 3,000 m$^2$.

The effect of the treatment was evident after about one week, by growth and greening of the treated plants. After about two weeks following the onset of treatment, the so-treated plants were greener and showed more pronounced growth than the non-treated plants which had a *priori* a better condition.

All the above examples show that the fertilizer compositions in accordance with the present invention are highly effective in administering metal ions to plant roots. Furthermore, it may be appreciated that the inventive composition has a big advantage over prior art compositions such as FeEDDHA, as they have a much lower cost than the commercially available synthetic chelates.

We claim:

1. A method for providing metal ions consisting of Fe$^{+3}$, Mn$^{+2}$, Cu$^{+2}$ and Zn$^{+2}$ to plant roots, which method comprises administering to the soil in which the plants grow, a plant soil fertilizer composition consisting of citric acid, the citric acid chelating the metal ions, the citric acid being essentially a sole chelating agent, the molar ratio of citric acid concentration to the sum of the concentration of said metal ions being about 0.5 to 2.5.

2. A method according to claim 1, wherein said molar ratio is about 0.8 to 2.0.

3. A method according to claim 2, wherein said molar ratio is about 1.0 to 1.5.

4. A method according to claim 1 for the treatment of plant chlorosis.

5. A method according to claim 1, wherein said composition is dry particulate solid.

6. A plant fertilizer composition consisting of the metal ions Fe$^{+3}$, Mn$^{+2}$, Cu$^{+2}$ and Zn$^{+2}$ and citric acid, the citric acid chelating the metal ions, the citric acid being essentially a sole chelating agent, the molar ratio of citric acid concentration to the sum of the concentration of said metal ions being about 0.5 to 2.5.

7. A composition according to claim 6, wherein said molar ratio is about 0.8 to 2.0.

8. A composition according to claim 6, wherein said molar ratio is about 1.0 to 1.5.

9. A composition according to claim 6, being in the form of a dry particulate solid.

10. A composition according to claim 6, being in the form of an aqueous solution.

* * * * *